United States Patent [19]

Koga et al.

[11] Patent Number: 4,555,751
[45] Date of Patent: Nov. 26, 1985

[54] RECTIFIED AND SMOOTHED DC SUPPLYING CIRCUITRY

[75] Inventors: Yoshiro Koga, Ashiya; Kenji Nakao, Neyagawa, both of Japan

[73] Assignee: Onkyo Kabushiki Kaisha, Neyagawa, Japan

[21] Appl. No.: 480,804

[22] Filed: Mar. 31, 1983

[30] Foreign Application Priority Data

Apr. 2, 1982 [JP] Japan ............................ 57-48770[U]

[51] Int. Cl.⁴ .......................................... H02M 1/12
[52] U.S. Cl. .................................... 363/44; 363/126; 307/105
[58] Field of Search ...................... 363/44, 45, 46, 47, 363/48, 52, 53, 125, 126, 128; 307/105, 146, 317, 540, 542, 559, 561, 565

[56] References Cited

U.S. PATENT DOCUMENTS

| | | | |
|---|---|---|---|
| 3,069,562 | 12/1962 | Steele | 307/317 |
| 3,166,639 | 1/1965 | Babb | 307/565 |
| 3,911,324 | 10/1975 | Bishop | 363/52 |

FOREIGN PATENT DOCUMENTS

639111  12/1978  U.S.S.R. ............................ 363/126

*Primary Examiner*—William H. Beha, Jr.
*Assistant Examiner*—Jeffrey Sterrett
*Attorney, Agent, or Firm*—Cushman, Darby & Cushman

[57] ABSTRACT

A DC power supply circuitry comprises an AC power source transformer with its secondary winding having a center tap; a rectifier circuit; a smoothing circuit; and a bidirectional switching circuit having predetermined threshold values, interposed in between the center tap and the smoothing circuit.

7 Claims, 20 Drawing Figures

←—— 100msec ——→

←—100msec—→

←—10msec—→

RECTIFIED AND SMOOTHED DC SUPPLYING CIRCUITRY

BACKGROUND OF THE INVENTION (1) Field of the Invention

This invention relates to rectified and smoothed DC supplying circuitry for a B-class audio power amplifier or the like.

(2) Description of the Prior Art

Figure 1:
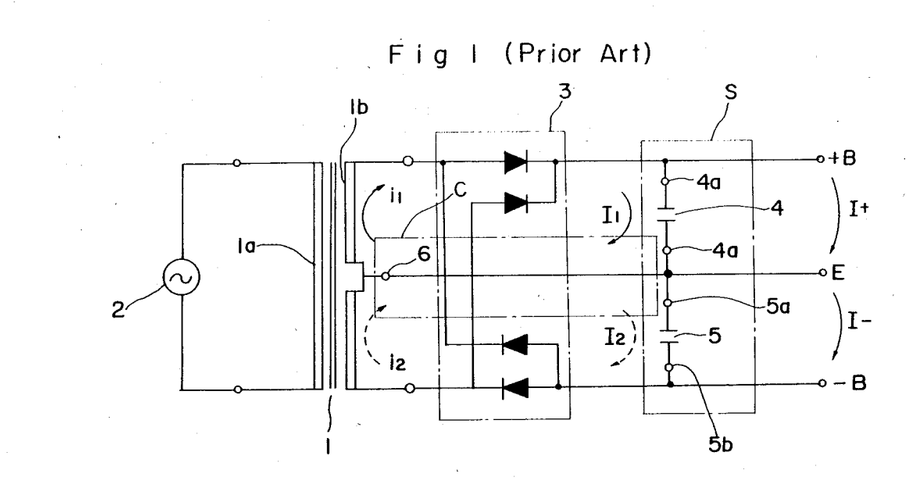
FIG. 1 is a diagram of a typical example of the conventional power supply circuitry, as has already been referred to hereinbefore.

A typical example of the conventional circuitry for supplying rectified and smoothed DC power for instance to a B-class audio power amplifier is shown in FIG. 1, in which a transformer 1 is given an input to its primary winding 1a from a commercial AC power source 2. The AC output of its secondary winding 1b is rectified by a rectifier circuit 3 and the rectified output is supplied to a smoothing circuit S having two capacitors 4, 5, more particularly across a positive-end terminal 4a of a positive-side capacitor 4 and a negative-end terminal 5b of a negative-side capacitor 5. Both these terminals 4a, 5b are made here to serve as the positive and negative output DC terminals, respectively. To the center junction of these serially connected capacitors 4, 5 there is connected an end of a center-tap lead circuit C of the secondary winding 1b.

When the thusly constructed power supply circuitry is supplying to the loads the respective currents I+ and I− as illustrated, there accordingly flow charging currents $I_1$ and $I_2$ of the capacitors 4 and 5, respectively, of intensity generally proportional to the load currents I+ and I−. Through the secondary winding 1b of the transformer 1 in such operation, there flow both the load currents and the charging currents, and in view that the charging of each capacitor 4 or 5 is attributed to a respective half side of the secondary winding 1b as delimited by the center tap 6, the respective secondary winding currents are referred to as $i_1$ and $i_2$ as shown in FIG. 1. Accordingly, the intensity of the current flowing through the center-tap lead circuit C is the balance of the respective secondary winding currents $i_1$, $i_2$, thus $i_1 - i_2$. Thus, in the respective half sides of the secondary winding 1b, as delimited by the center tap 6, there flow currents having intensity different with each other. Even if the load currents I+ and I− are the same in intensity the one as the other, the respective secondary winding currents $i_1$, $i_2$ actually are seldom of equal intensity, on account of the irregularity as is unavoidable between both the capacitors 4, 5 and also the irregularity between the respective half sections of the secondary winding 1b delimited by the center tap 6, or still further the like.

Though not clear from FIG. 1, it is supposed that both the positive-side and negative-side loads have considerable inductance. Under such supposition, and further supposing the case where the center-tap lead circuit C had been omitted or blockedly interrupted, then dangerous voltages far higher than the output AC peak voltages of the secondary winding half sections might occur across the respective capacitors 4, 5 if and when the respective loads should show extravagantly rapid fluctuation by some reason or other, and would destroy the capacitors 4, 5 which are normally designed to endure rather moderate maximum voltages, thus of only moderate degree of safety coefficient. However, the conventional circuitry of FIG. 1 is actually provided, as has been described hereinbefore, with the center-tap lead circuit C which functions to safely draw out such extraordinarily increasing voltages across the respective capacitors, and this function is therefore the merit of the conventional circuitry of this type.

Figure 2:
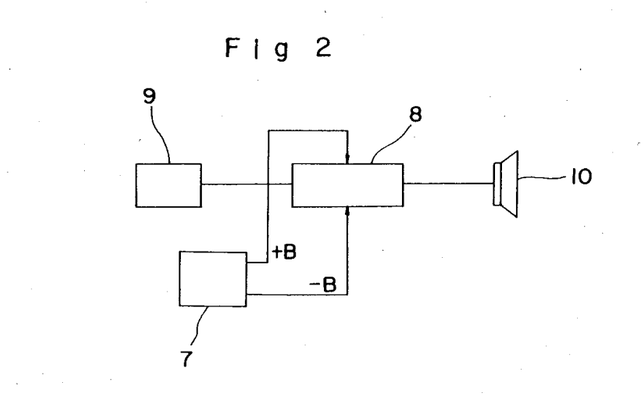
FIG. 2 is a block diagram of an audio system using the power supply circuitry as a component thereof, similarly as has been referred to and described.

Referring here to FIG. 2, consider the case where the power supply circuitry 7 has as its load a power amplifier 8 for amplifying an input audio signal from a signal source 9 and reproducing the sound by means of a loudspeaker 10. If the frequency of the input signal is lower than the frequency of the power source 2 (FIG. 1), then the charging currents $I_1$, $I_2$ of the capacitors 4, 5, respectively, fluctuate in the frequency identical with that of the input signal but in 180° out-of-phase relationship in the signal frequency with respect to each other. Consequently, the capacitor-charging currents, center-tap lead circuit current, secondary winding current and primary winding current have all of them the respective components of the input signal frequency. On the other hand, even if the input signal frequency is sufficiently higher than the power source frequency, the said respective currents have as yet the components of the input signal frequency, on account of the irregularities, as mentioned hereinbefore, of the various constituent parts.

Figure 3A:
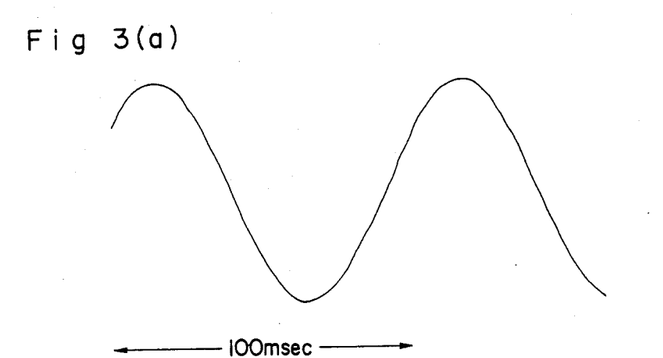
FIGS. 3(a), 3(b), and 3(c) show, as juxtaposed charts, wave forms of a continuous low frequency input signal and power source transformer secondary winding currents both in the conventional circuitry of FIG. 1 and in the circuitry according to this invention of FIG. 8.
Figure 3B:
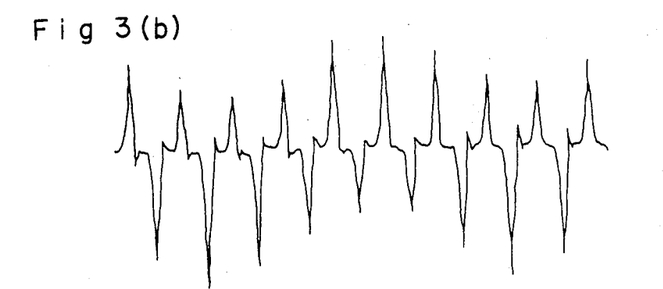

FIG. 3(a) shows an example of 10 Hz input signal wave form, thus of the frequency far lower than that of the power source to be supposed as 60 Hz. When such signal is amplified by the conventional power amplifier to reproduce the sound by the loudspeaker (speaker output voltage of 3,162 V across the impedance of 8Ω), per the system of FIG. 2, then the secondary winding current shows the wave form upon passing through a low-pass filter, thus deprived of the higher frequency components beyond 500 Hz, as FIG. 3(b). The frequency spectrum thereof is shown in dot line charting in FIG. 4.

Figure 5A:
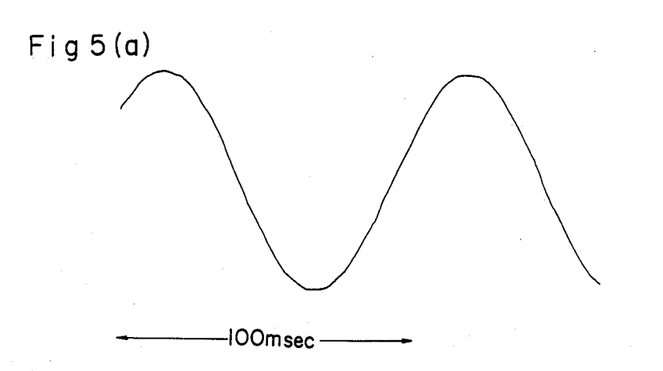
FIGS. 5(a), 5(b), and 5(c) show charts similar to FIG. 3, but here of the power source transformer center-tap lead circuit currents.
Figure 5B:
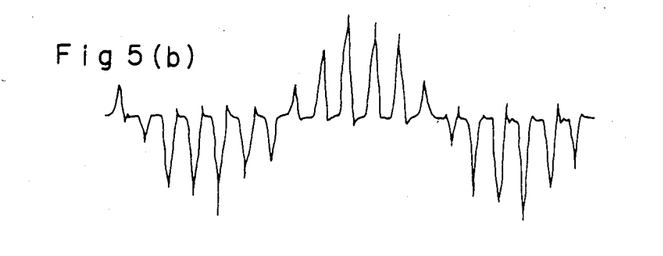
Figure 6:
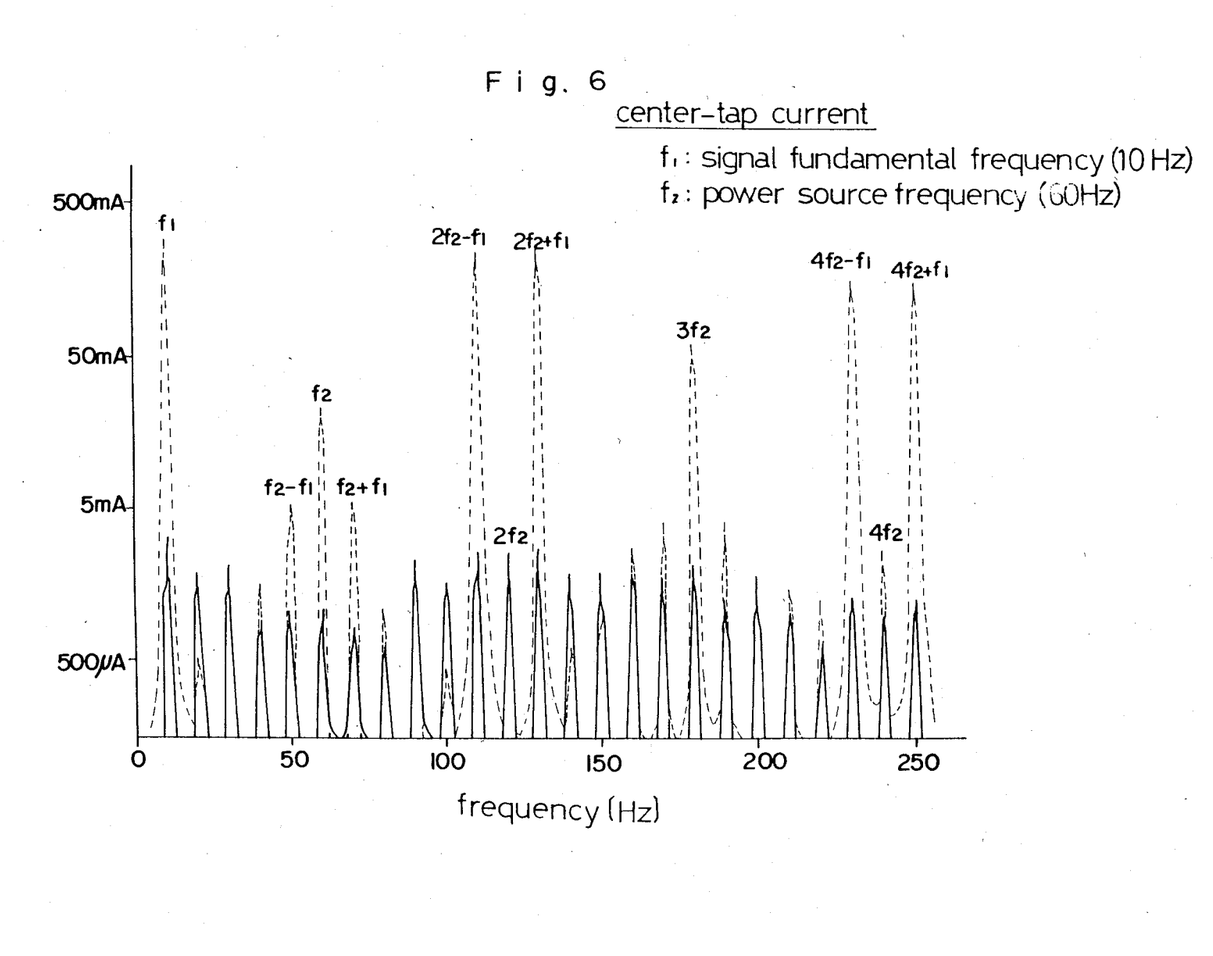
FIG. 6 shows frequency spectra similar to FIG. 4, but here of both the center-tap lead circuit currents shown in FIG. 5.

The same input signal wave form is again given as FIG. 5(a), and shown in contrast herewith as FIG. 5(b) directly thereunder is the wave form of the center-tap lead circuit current, also as deprived of the higher frequency components beyond 500 Hz, while the frequency spectrum thereof is shown in dot line charting in FIG. 6.

From these actually measured results, it has thus experimentally been proved that in the power source transformer secondary winding current and the center-tap lead circuit current there are included not only the amplitude information of the input signal but also the signal frequency components, of which particularly conspicuous are the components of the added sum and the subtracted balance frequencies as derived from the signal fundamental frequency $f_1$ on the one hand and the harmonics of the power source frequency $f_2$ in the order of even numbers on the other hand.

Figure 7:
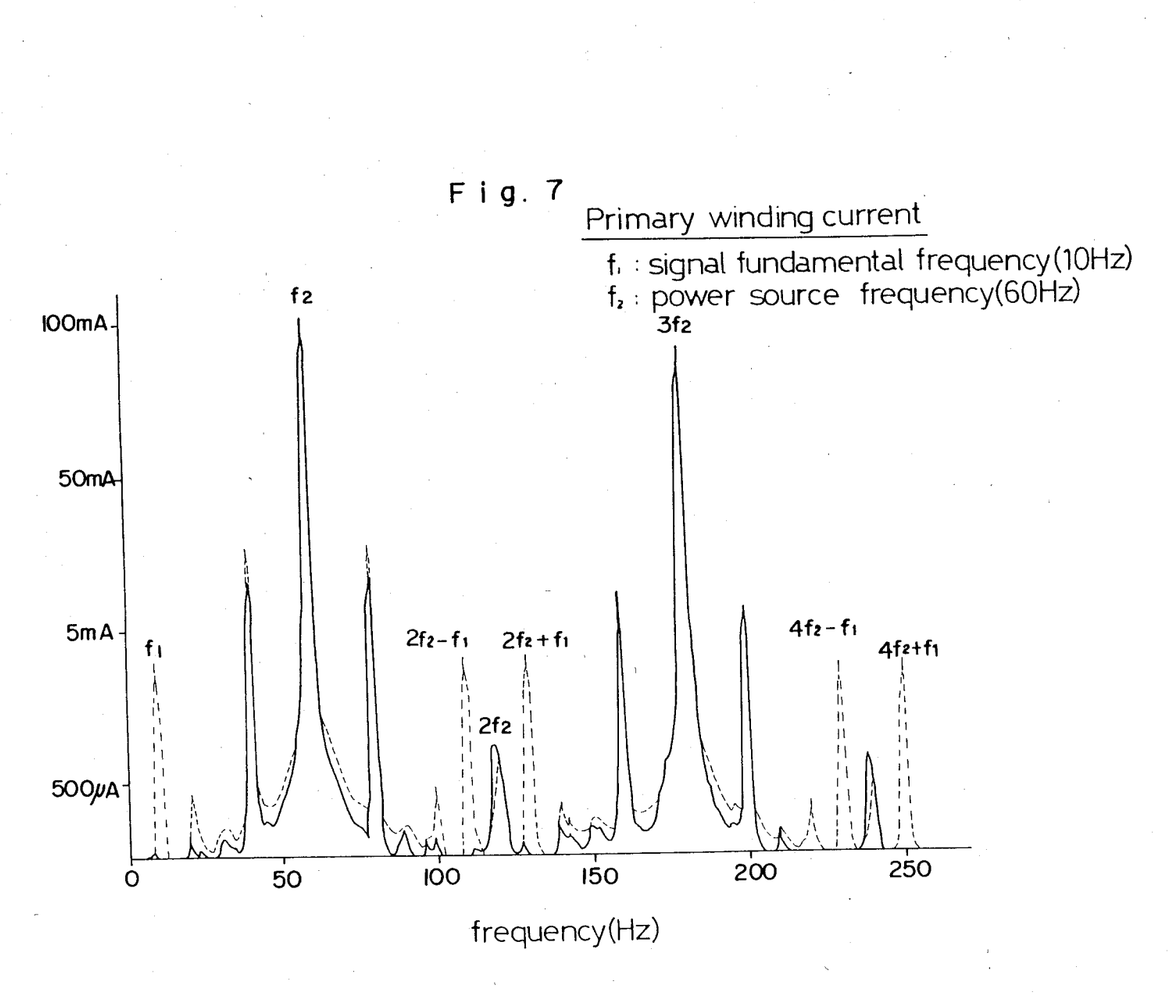
FIG. 7 shows frequency spectra similar to FIGS. 4 and 6, but here of the power source transformer primary winding currents.

Situation is also just similar as to the power source transformer primary winding current, of which the frequency spectrum is represented by dot line charting in FIG. 7, showing as well that there are many mixed-up modulation components as derived from the signal fundamental frequency $f_1$ and the power source frequency $f_2$.

As is seen from the above, the power source transformer primary winding current and secondary winding current, capacitor currents and center-tap lead circuit currents in such conventional power supply circuitry include not only the input signal amplitude information but also the signal (frequency) information, and in this consequence the use of such circuitry has resulted in distortion on account that such signal information may sneak either directly into the circuits as are immediately connected to the power source circuit or else in the case of other circuits having no such immediate connection then indirectly through the intermediary of the function of electromagnetic induction.

SUMMARY OF THE INVENTION

This invention has as its object to remedy the drawback, as described hereinabove, of the conventional power supply circuitry. In order to attain the object, the power supply circuitry according to this invention, comprises: a rectifying the circuit for rectifying AC output of a secondary winding of a power source transformer; a smoothing circuit consisting of positive-side and negative-side smoothing capacitors connected in series; and a center-tap lead circuit of the secondary winding, connected at least indirectly to the smoothing circuit, is constructed such that a bidirectional switching circuit having predetermined threshold values is interposed in between the smoothing circuit and the center-tap lead circuit.

In the power supply circuitry according to this invention, the center-tap lead circuit current is blocked up so long as the potential or voltage of the junction point between the smoothing circuit and the bidirectional switching circuit resides within the region delimited by both threshold values of the bidirectional switching circuit. Therefore, the two smoothing capacitors then commonly have one and the same charging path, and the charging current flows through these two capacitors and the two sections of the secondary winding on both sides of the center tap, all of them being connected in series. Since the charging current is thus one and the same with respect to both the capacitors, such current includes only the amplitude information of the signal but not the signal frequency components. In consequence hereof, the primary winding current and secondary winding current, as well as the capacitor current, are also made to have quite remarkably reduced input signal frequency components. On the other hand, however, blocking up the possibility of the current to flow through the center-tap lead circuit might lead to the danger of destroying the capacitors in the smoothing circuit if and when extraordinary high voltage would appear in consequence of abrupt extravagant load fluctuation or the like; but the capacitors are securely protected in this circuitry according to this invention against such danger since free passage of the center-tap lead circuit would be provided by the bidirectional switching circuit immediately upon occurrence of the voltage thereacross, which would be outside the blocking region delimited by both the thresholds thereof.

Still further advantages of this invention will be apparent from the detailed description to follow hereunder with reference to the accompanying drawings.

DESCRIPTION OF THE PREFERRED EMBODIMENTS

Figure 8:
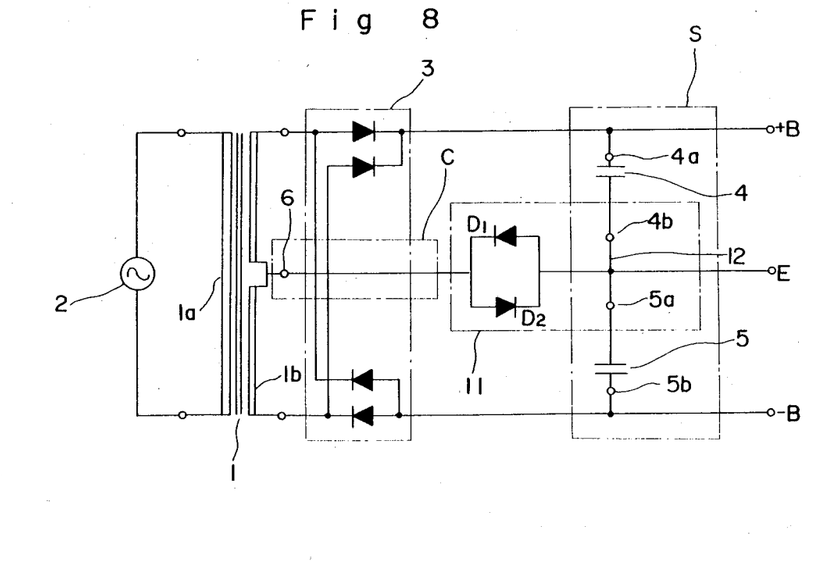
FIG. 8 is a diagram of an embodiment of the power supply circuitry according to this invention.

A fundamental or typical embodiment of the power supply circuitry according to this invention is shown in FIG. 8, and it comprises: a rectifying circuit 3 for rectifying AC output of a secondary winding 1b of a transformer 1 connected to a power source 2; a smoothing circuit S consisting of positive-side and negative-side smoothing capacitors 4, 5 connected in series and an electrically conducting member 12 interconnecting a negative-end terminal 4b of the positive-side capacitor 4 and a positive-end terminal 5a of the negative-side capacitor 5; a center-tap lead circuit C of the secondary winding 1b and a bidirectional switching circuit 11 having predetermined threshold values, interposed in between the electrically conducting member 12 and the center-tap lead circuit C.

Illustrated here as a specific embodiment of the bidirectional switching circuit 11 is a pair of diodes $D_1$, $D_2$ oriented in opposite directions to each other and connected in parallel.

When the thusly constructed circuitry is operating with a potential or voltage difference across the bidirectional switching circuit 11 (thus between the center tap 6 of the transformer 1 and the electrically conducting member 12 interconnecting the capacitors 4, 5) residing within the region delimited by both threshold values of the bidirectional switching circuit 11, namely of the absolute value of the forward direction potential drop of the respective diodes $D_1$, $D_2$ (approximately 0.6 V ), then the center-tap lead circuit current is blocked by these diodes $D_1$, $D_2$ and cannot flow therethrough until the potential difference thereacross exceeds such delimited region. Consequently, the two capacitors 4, 5 then commonly have one and the same charging path, and the charging current flows through these two capacitors 4, 5 and the two sections of the secondary winding 1b on both sides of the center tap 6, all of them being connected in series. Since the charging current is thus one and the same with respect to both the capacitors 4, 5, such current includes only the amplitude information of the signal but in no substantial degree the signal frequency components. In consequence hereof, the primary and secondary winding currents, as well as the capacitor current, also include only the amplitude information of the signal but in no substantial degree the signal frequency components.

Figure 3C:
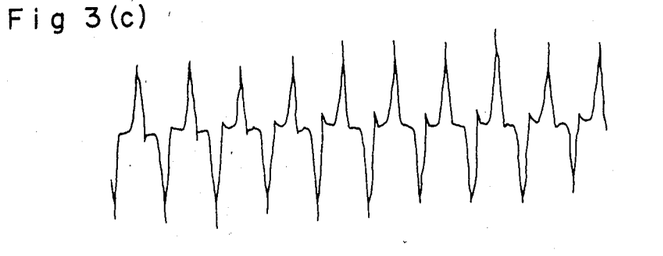
Figure 4:
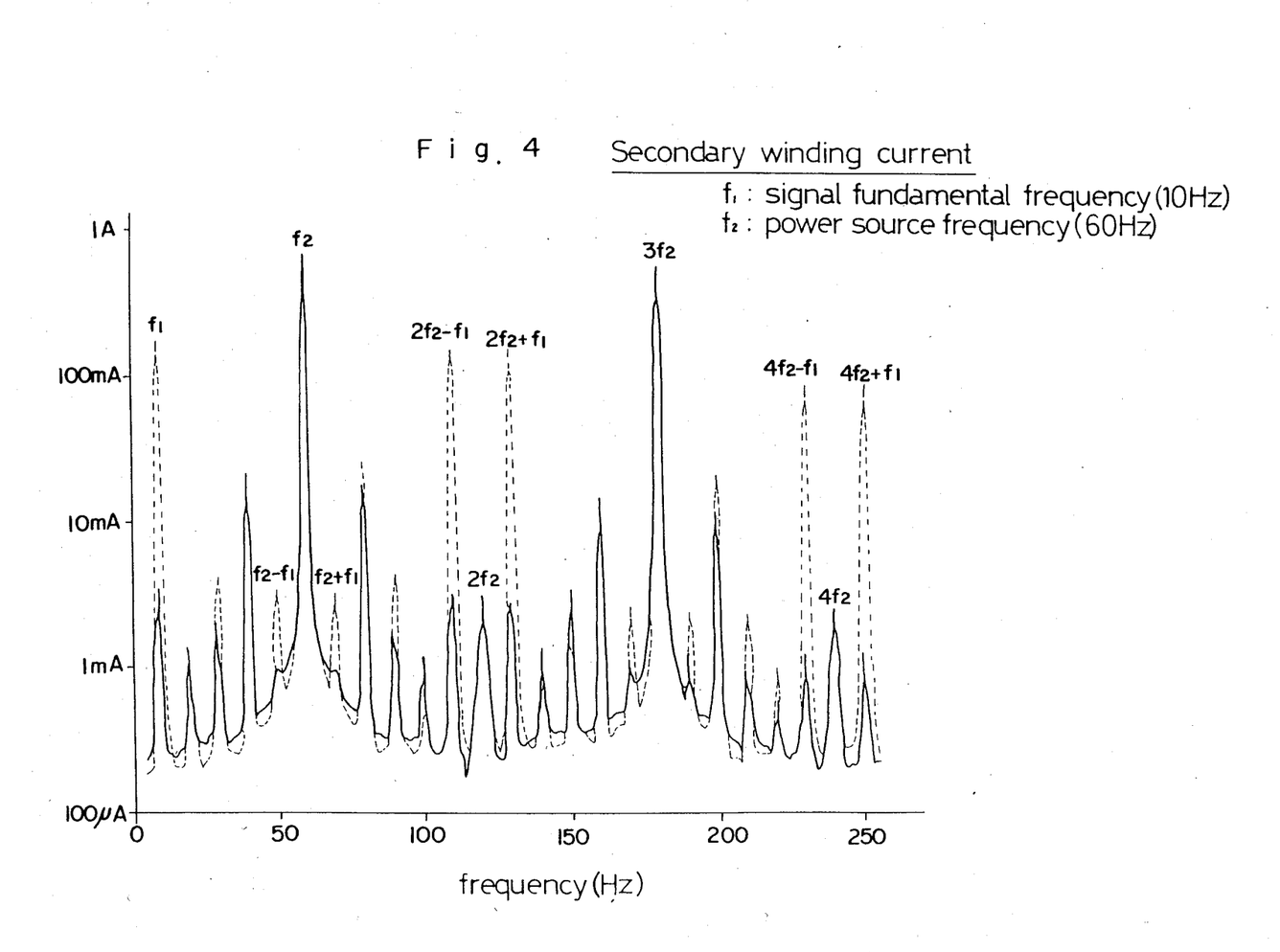
FIG. 4 shows frequency spectra of both the secondary winding currents shown in FIG. 3.

On the measurement conditions identical with those for the conventional circuitry described hereinbefore with reference to the obtained results shown in FIGS. 3(b), 4, 5(b), 6 and 7, the secondary winding current obtained with the circuitry according to this invention, also being deprived of the higher frequency components beyond 500 Hz, gives the wave form of FIG. 3(c), and the frequency spectrum as shown by the solid line charting in FIG. 4. As is clear from FIG. 4, when comparing the solid and dotted lines, particularly remarkably reduced by this invention are the components of:

the input signal fundamental frequency $f_1$, and the added sum and the subtracted balanced frequencies as derived from the signal fundamental frequency $f_1$ on the one hand and the power source frequency $f_2$ and harmonics thereof in the order of even numbers on the other hand, thus, $f_2 \pm f_1$, $2f_2 \pm f_1$, $4f_2 \pm f_1$, ....

Figure 5C:
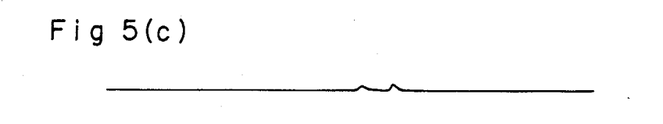

Similarly, the center-tap lead circuit current, also being deprived of the higher frequency components beyond 500 Hz, gives the wave form of FIG. 5(c), and the frequency spectrum as shown by the solid line charting in FIG. 6. As is similarly clear from FIG. 6, particularly remarkably reduced by this invention are the components of:

the input signal fundamental frequency $f_1$, the power source frequency $f_2$ and harmonics thereof in the order of odd numbers, and the added sum and the subtracted balance frequencies as derived from the signal fundamental frequency $f_1$ on the one hand and the power source frequency $f_2$ and harmonics thereof in the order of even numbers on the other hand, thus, $f_2 \pm f_1$, $2f_2 \pm f_1$, $4f_2 \pm f_1$, ....

Again similarly, the transformer primary winding current shows the frequency spectrum as represented by solid line charting in FIG. 7, thus demonstrating the particularly remarkable reduction of the frequency components of:

$2f_2 \pm f_1$, $4f_2 \pm f_1$, ....

Figure 9A:
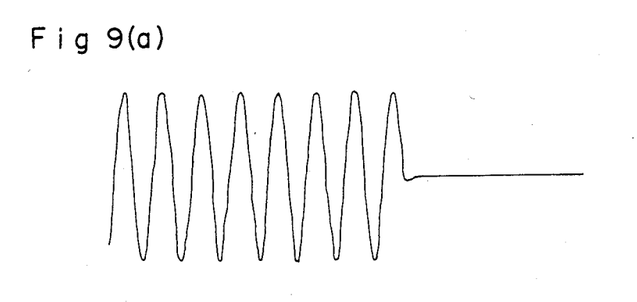
FIGS. 9(a), 9(b), and 9(c) show charts similar to FIG. 5, but here using a tone-burst wave instead of the continuous wave signal used in FIG. 5.
Figure 9B:
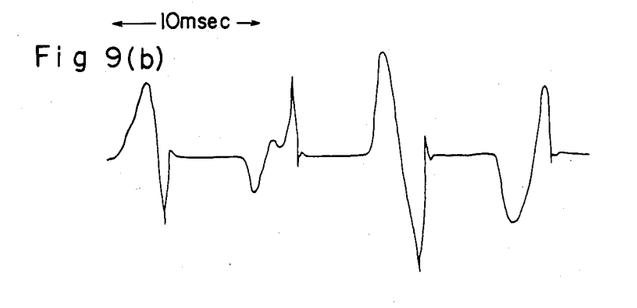
Figure 9C:
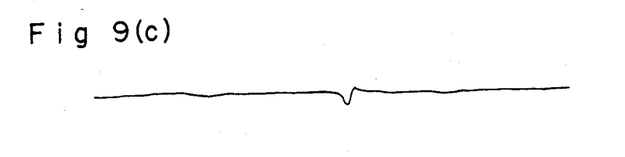
Figure 10:
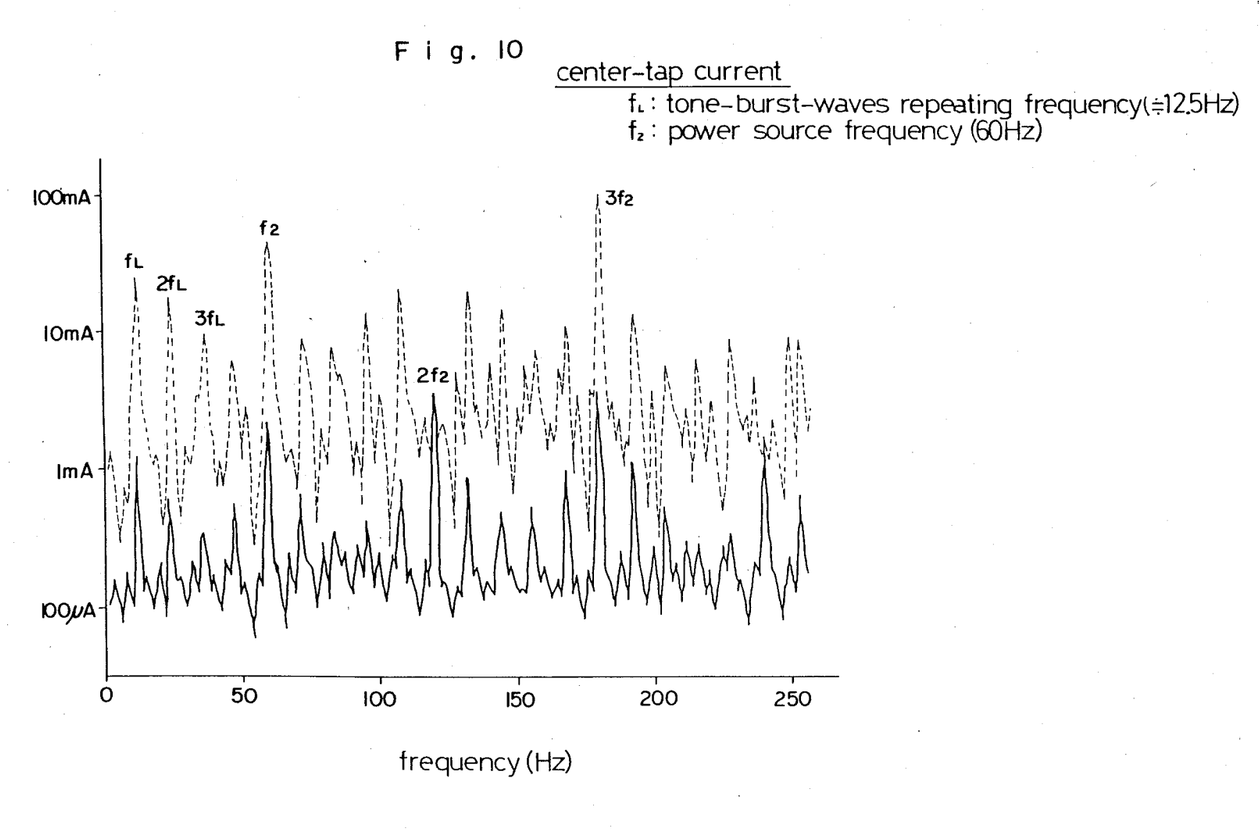
FIG. 10 shows frequency spectra similar to FIG. 6, but here of both the center-tap lead circuit currents shown in FIG. 9.

FIGS. 9 and 10 show the results of the center-tap lead circuit current waveforms and the frequency spectra thereof, when a 400 Hz tone-burst (with 8~24 waves) is given from the signal source as designated at block 9 in the system shown in FIG. 2 already referred to and described hereinbefore. FIG. 9(a) shows a specific example of such an input burst signal; FIG. 9(b) is the obtained wave form when the conventional circuitry of FIG. 1 is used; and FIG. 9(c) is the obtained wave form when the circuitry of FIG. 8 according to this invention is used. In FIG. 10, shown in solid line charting is the frequency spectrum of the current shown in FIG. 9(c), while in dotted line charting is that of the current shown in FIG. 9(b).

Figure 11:
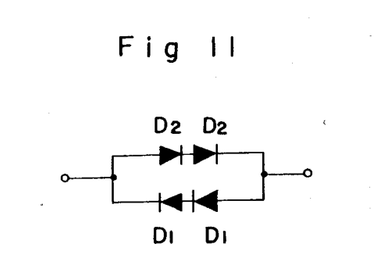
FIGS. 11, 12 and 13 are diagrammatic views of the respective modifications of the bidirectional switching circuit used in the circuitry of FIG. 8.
Figure 12:
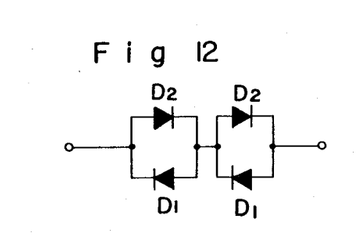
Figure 13:
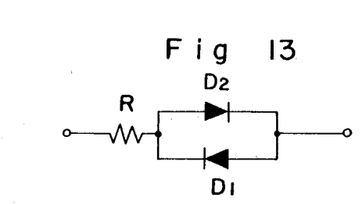

Describing the function of the parallel pair of diodes $D_1$, $D_2$ constituting the bidirectional switching circuit 11, they immediately permit the center-tap lead circuit current to flow therethrough just upon initial building up of the dangerous voltage, namely when the positive-side and negative-side DC load-terminal voltages show extravagant imbalance on account of irregularities of the load conditions as well as of the rectifier circuit diodes and both smoothing capacitors and when the positive and negative DC voltage imbalance comes to threaten the endurable voltage limit of the capacitors or otherwise to affect any of the circuitry components, more specifically when the voltage difference between the center tap 6 and the electrically conducting member 12 interconnecting both the capacitors 4, 5 comes off the blocking region delimited by the thresholds of the diodes $D_1$, $D_2$; and thus securely protect both these capacitors 4, 5 by such permission of free flowing of the center-tap lead circuit current. In such safety designing, if the maximum permissible imbalance between such positive-side and negative-side DC load-terminal voltages is higher than the forward direction voltage drop of a diode, then the bidirectional switching circuit 11 may be constructed either as shown in FIG. 11, thus with a pair of parallelly connected segments, each said segment consisting of a plurality of serially connected diodes $D_1$ respectively $D_2$ oriented in a direction uniform in each segment but such diode directions of the two segments being opposite one segment to the other segment, or as shown in FIG. 12, thus with a plurality of serially connected diode pairs, each said pair consisting of diodes $D_1$, $D_2$ oriented in opposite directions to each other and connected in parallel. It is as well possible, when it is preferred or desired to limit the center-tap lead circuit current, to construct the bidirectional switching circuit 11 as shown in FIG. 13, thus with: a pair of diodes $D_1$, $D_2$ oriented in opposite directions to each other and connected in parallel; and a current-limiting resistor R interposed in series to the parallelly connected diode pair.

Figure 14:
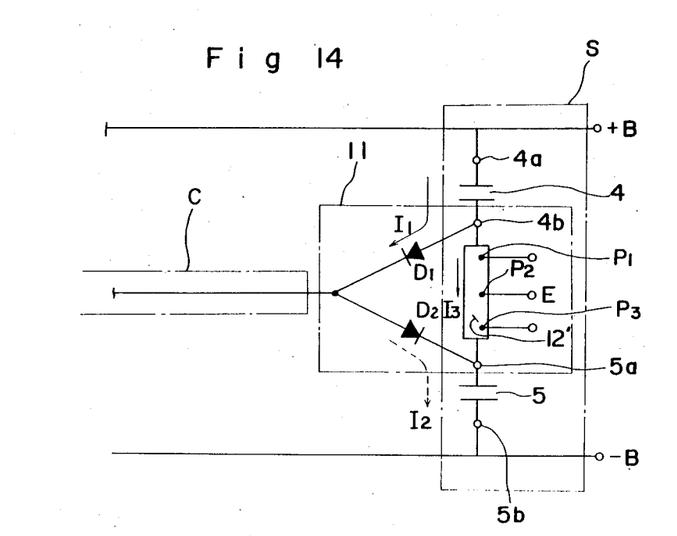
FIG. 14 is a fractional diagrammatic view of an essential portion of a modified circuitry according to this invention.

Referring now to FIG. 14, shown there fractionally is a modified embodiment of this invention, omitting the portions identical with the former embodiment shown in FIG. 8 and described hereinbefore with reference thereto, thus illustrating only the portions directly relating to the modification, from which a further novel advantage occurs in the case the center-tap lead circuit current is permitted by the bidirectional switching circuit 11 on account of displacement of the voltage between the center tap 6 and the junction interconnecting both the capacitors 4, 5, thus an electrically conducting plate 12' as shown here in this specific instance in substitution for the electrically conducting member 12 shown in the former embodiment as shown in FIG. 8, off the blocking region delimited by both threshold values of the bidirectional switching circuit 11.

As illustrated, the electrically conducting plate 12' which is supposed to be a bus earth or matrix plate is such that one end is connected to the negative-end terminal 4b of the positive-side capacitor 4 and the other end is connected to the positive-end terminal 5a of the negative-side capacitor 5, and that it has junction terminals $P_1$, $P_2$, $P_3$ to which the respective matrix or earth lines of the main load power amplifier and of other circuits, such for instance as the preceding voltage amplifiers, may be connected.

As is also seen, a diode $D_1$ is interposed in between the center-tap lead circuit C and the negative-end terminal 4b of the positive-side smoothing capacitor 4, in such orientation that the diode cathode is connected to the center-tap lead circuit C; and another diode $D_2$ is interposed in between the center-tap lead circuit C and the positive-end terminal 5a of the negative-side smoothing capacitor 5, in such orientation that the diode anode is connected to the center-tap lead circuit C. Though these constituent elements of the bidirectional switching circuit 11 have hereinabove been referred to specifically as diodes $D_1$, $D_2$, each or any of them may be replaced by any suitable unidirectional switching element or circuit, what is important being that the threshold or break-over voltage thereof should have the value as actually desired.

When the thusly constructed circuitry is operating with the potential or voltage difference across the bidirectional switching circuit 11, thus between the center tap 6 and the negative-end terminal 4b of the positive-side capacitor 4 or the positive-end terminal 5a of the negative-side capacitor 5, residing within the region delimited by both the threshold values of the said bidirectional switching circuit 11, then the center-tap lead circuit current is blocked by this bidirectional switching circuit 11, thus accruing therefrom the advantage just the same as has hereinbefore been described with respect to the former embodiment of FIG. 8.

On the other hand, when the potential difference between the center tap 6 and the negative-end terminal 4b of the positive-side capacitor 4 or the positive-end terminal 5a of the negative-side capacitor 5 comes off the blocking region delimited by the thresholds of the diodes $D_1$, $D_2$, supposing for instance the case where the said potential difference get beyond the threshold of the diode $D_1$, then the dangerously increasing current as is charging the capacitor 4 is drawn out or released to freely flow to the center tap 6, most part of the current passing through the thusly conducting diode $D_1$, with the path to pass through the electrically conducting plate 12' and the other diode $D_2$ then being blocked by the thusly inversely biased diode $D_2$.

Accordingly, intensity of the current passing in between the capacitors 4, 5 through the electrically conducting plate 12', designated at $I_3$, remains small and shows therefore only slight fluctuations relative to such extraordinarily flowing center-tap lead circuit current which is under the above supposition substantially the current $I_1$ as is charging the capacitor 4.

As is clear from the above, voltage fluctuations in between the respective earth line terminals $P_1$, $P_2$, $P_3$ of the electrically conducting plate 12' are always kept small, to thus retain the voltage amplifiers or the like working on the basis of these earth lines to be affected quite slightly and therefore to remarkably reduce distorion in their outputs.

We claim:

1. A rectified and smoothed DC supply circuit for use with an audio amplifier which amplifies input audio signals, said DC supply circuit comprising:
    a power source transformer having primary and secondary windings;
    a rectifying circuit for rectifying an AC output from said secondary winding of said power source transformer;
    a smoothing circuit consisting of positive-side and negative-side smoothing capacitors connected in series;
    a center-tap lead circuit of said secondary winding coupled to said smoothing circuit;
    a bidirectional switching circuit, having predetermined threshold values, coupling said smoothing circuit and said center-tap lead circuit, and provided for conducting charging current between said smoothing circuit and said center-tap lead circuit when the voltage at connecting points between said center-tap lead circuit and said smoothing circuit exceeds said predetermined thresholds;
    first and second output terminals, said first output terminal coupled between a first output terminal of said secondary winding and said positive-side smoothing capacitor, and said second output terminal coupled between a second output terminal of said secondary winding and said negative-side smoothing capacitor, said first and second output terminals being connected to said audio amplifier.

2. The circuit of claim 1, in which the bidirectional switching circuit comprises a pair of diodes oriented in opposite directions to each other and connected in parallel.

3. The circuit of claim 2, in which the bidirectional switching circuit further includes a current-limiting resistor interposed in series to the parallelly connected diode pair.

4. The circuit of claim 1, in which the bidirectional switching circuit comprises a plurality of serially connected diode pairs, each of said pairs consisting of diodes oriented in opposite directions to each other and connected in parallel.

5. The circuit of claim 1, in which the bidirectional switching circuit comprises a pair of parallelly connected segments, each said segment consisting of a plurality of serially connected diodes oriented in a direction uniform in each segment but such diode directions of the two segments being opposite one segment to the other segment.

6. The circuit of claim 1, in which the bidirectional switching circuit comprises:
    an electrically conducting member, dually serving also as a component of the smoothing circuit, such that one end is connected to a negative-end terminal of the positive-side smoothing capacitor, and the other end is connected to a positive-end terminal of the negative-side smoothing capacitor,
    a diode interposed in between the center-tap lead circuit and the negative-end terminal of the positive-side capacitor at least via the said electrically conducting member, in such orientation that the diode cathode is connected to the center-tap lead circuit, and
    another diode interposed in between the center-tap lead circuit and the positive-end terminal of the negative-side smoothing capacitor at least via the said electrically conducting member, in such orientation that the diode anode is connected to the center-tap lead circuit.

7. The circuit of claim 6, in which the said electrically conducting member is a bus-earth electrically conducting plate.

* * * * *